US012625595B2

(12) United States Patent
Sedouram et al.

(10) Patent No.: US 12,625,595 B2
(45) Date of Patent: May 12, 2026

(54) INTERACTIVE GUI ELEMENTS FOR INDICATING OBJECTS TO SUPPLEMENT REQUESTS FOR GENERATIVE OUTPUT

(71) Applicant: GOOGLE LLC, Mountain View, CA (US)

(72) Inventors: Ramprasad Sedouram, Bangalore (IN); Karthik Srinivas, Bangalore (IN); Dharma Teja, Warsaw (PL); Saachi Grover, Bangalore (IN); Ajay Prasad, Bangalore (IN)

(73) Assignee: GOOGLE LLC, Mountain View, CA (US)

( * ) Notice: Subject to any disclaimer, the term of this patent is extended or adjusted under 35 U.S.C. 154(b) by 40 days.

(21) Appl. No.: 18/766,481

(22) Filed: Jul. 8, 2024

(65) Prior Publication Data

US 2026/0010273 A1      Jan. 8, 2026

(51) Int. Cl.
*G06F 3/04815* (2022.01)
*G06F 9/451* (2018.01)
(52) U.S. Cl.
CPC .......... *G06F 3/04815* (2013.01); *G06F 9/451* (2018.02)

(58) Field of Classification Search
CPC ............................. G06F 3/04815; G06F 9/451
USPC ........................................................ 345/419
See application file for complete search history.

(56) References Cited

U.S. PATENT DOCUMENTS

2019/0163687 A1      5/2019   Edecker et al.
2020/0073901 A1      3/2020   Stein et al.
2022/0068029 A1      3/2022   Lane et al.

*Primary Examiner* — Tammy Paige Goddard
(74) *Attorney, Agent, or Firm* — Gray Ice Higdon

(57) ABSTRACT

Implementations set forth herein relate to a graphical user interface (GUI) element that can be manipulated at an interface to indicate a particular object and/or feature of interest to be considered when providing generative output for a separate user request. One or more GUI elements can be provided at a display interface, such as a touch display panel and/or virtual or augmented reality display interface, thereby allowing the GUI elements to be associated with rendered and/or tangible objects. When a user interacts with a GUI element, the GUI element can exhibit responsive behavior that is based on features of the interaction and/or other features of a particular object. When an object of interest is identified, processing can be performed to identify information about the object, and this information can then be utilized to facilitate provisioning of a generative output that is responsive to a separate user request.

20 Claims, 10 Drawing Sheets

300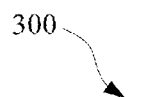

COMPUTING DEVICE
302

USER INTERFACE
320

APPLICATIONS
334

APPLICATION
DATA
330

MODEL DATA
332

CONTEXTUAL
DATA
336

APPLICATION / AUTOMATED ASSISTANT
304

INPUT PROCESSING ENGINE
306

SPEECH PROCESSING ENGINE
308

DATA PARSING ENGINE
310

PARAMETER ENGINE
312

OUTPUT GENERATING ENGINE
314

MODEL INPUT ENGINE
322

TRAINING DATA
338

OBJECT SELECTION ENGINE
316

GESTURE PROCESSING ENGINE
318

MODEL SELECTION ENGINE
326

GENERATIVE OUTPUT ENGINE
324

*FIG. 3*

INTERACTIVE GUI ELEMENTS FOR INDICATING OBJECTS TO SUPPLEMENT REQUESTS FOR GENERATIVE OUTPUT

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

In some instances, a user may interact with an automated assistant, or other application, to receive assistance with various tasks that can be performed by a computing device, or otherwise facilitated by a computing device. However, an automated assistant may not be able to provide accurate responses to a user inquiry without relevant context. For example, a user viewing a display interface may provide an automated assistant with an inquiry regarding a particular portion of content in the display interface. In response, the automated assistant may provide a generated output based on the entire content of the display interface, and/or other contextual information, which may not be particularly relevant to the inquiry. As a result, the user may repeat their inquiry, thereby wasting resources at the computing device and any other remote device that may be employed to facilitate assistant functionality. Furthermore, processing of the content of the display interface can be wasteful when much of the content is not relevant to providing the generated output. For example, processing of non-specific display content can be performed using various machine learning models, and undertaking such processing can consume significant processing bandwidth. Therefore, determining how to facilitate accurate assistant responses and/or other outputs, while relying on less input content, can realize various benefits to local and remote devices, including reduced consumption of power and processing bandwidth.

SUMMARY

Implementations set forth herein relate to an automated assistant and/or another application that can provide generative output based on a natural language input and the location of one or more user configurable GUI elements at a display interface. For example, a user configurable GUI element can refer to a GUI shape, such as a droplet or other recognizable shape that can be relocatable at a display interface in response to a user input. The display interface can be, but is not limited to, a display panel, a touch display interface, a wearable display interface, a virtual reality GUI rendered at a device, an augmented reality GUI rendered at a device, and/or any other type of user interface. The GUI element can be relocated on the display interface to be increasingly or decreasingly associated with one or more objects that are visible via the display interface or other interface of a computing device. In some implementations, relocating the GUI element can be performed in response to one or more multi-modal inputs, or an input at a single interface of a computing device. For example, a multi-modal input can have an audio component, textual component, visual component, haptic component, tactile component, and/or any other component that can be associated with an input or an output for a computing device. In some implementations, a facial expression plus a hand or finger movement can result in a modification to one or more features of a GUI element (e.g., a location of the GUI element and a transparency of the GUI element). Alternatively, or additionally, a spoken input plus a touch input can result in a modification to a location and a size of a GUI element.

When the display interface refers to a portion of an augmented reality device, the GUI element can be a portion of a rendered augmented GUI that is visible via an interface that is at least partially transparent. As a result, the GUI element can appear adjacent to, over top of, and/or otherwise proximate to a tangible object in reality, and that is visible when a user is directing their gaze the object. Alternatively, and in some implementations, the GUI element can be displayed at a touch display interface, such as those embodied with tablet computing devices, cellular phones, desktop displays, and/or any other computing devices with display interfaces that may not be entirely transparent. In some implementations, the GUI element can be relocated and/or otherwise modified through user input.

In some implementations, user inputs can be multimodal for modifying the GUI element. For example, the location of a GUI element can be modified using a touch input gesture or non-touch gesture, such as the motioning of an extremity in front of a camera. Alternatively, or additionally, the location of a GUI element can be modified through a gaze input, spoken utterance, head movement, and/or any other type of user input that could be received at, or processed by, a computing device. Before, while, and/or after a GUI element is manipulated by a user to facilitate generative output, the user can provide a natural language input directed to receiving the generative output. For example, the user can be interacting with a computing device that provides access to an automated assistant, and the computing device can include a display interface that is rendering GUI content (e.g., content of an internet browser or other application). In some implementations, the GUI element can be in a default position at the display interface (e.g., in a corner), or otherwise can be invoked through a user invocation input.

In furtherance of receiving generative output, the user can provide a spoken utterance such as, "Tell me more about her." Prior to, during, or subsequent to the user providing this spoken utterance, the automated assistant can determine whether any element feature of one or more GUI elements are relevant to the spoken utterance from the user. For example, prior to, during, or subsequent to the user providing the spoken utterance, the user can manipulate the location of the GUI element to be at least partially overlapping an image of Aung San Suu. As a result, image processing can be performed using the GUI content to identify or otherwise determine the object that the GUI element is at least partially overlapping. In some implementations, the GUI content can be cropped using a local image processing service and/or a remote image processing service. This processing can result in reduced GUI content, which can be further processed using one or more image recognition processes, available via local computing device and/or a remote commuting device, to generate image data.

The image data generated using the image recognition processes can include natural language content, other text, embedding data, and/or any other data that can characterize GUI content. This image data can then be processed with natural language input data to provide a generative output.

For example, portions of the natural language input can be processed to determine any ambiguity regarding each portion, and a rank or score can be assigned to each portion to represent a degree of ambiguity of that particular portion. Alternatively, or additionally, image data and/or other data characterizing the reduced GUI content can be processed with the ambiguity data to indicate whether the generated data can resolve any ambiguity with any portion of the natural language input. When ambiguity can be resolved for a particular portion, the natural language input can be reconstructed such that the particular portion would have a lower degree of ambiguity relative to any previously determined degree. This reconstructed natural language input can then be processed using one or more trained machine learning models, such as one or more generative models, to provide generative output. Alternatively, or additionally, the natural language input can be processed with the generated data using one or more generative models (e.g., a large language model and/or any other suitable model) without preemptively using the generated data to resolve any ambiguity with the natural language, input. Alternatively, or additionally, preemptively reducing ambiguity of the natural language input can be a threshold decision, thereby relying on whether any particular portion of the natural language input exhibits a degree of ambiguity before causing certain processes to be initialized for reducing ambiguity.

When the image data and the natural language input have been determined, one or more generative models can be employed in furtherance of providing the generative output. For example, when the image data characterizing the reduced content (e.g., content adjacent to or overlapping the GUI element) is processed with the natural language input, the generative output can be more accurate relative to an otherwise ambiguous natural language input. In reference to the aforementioned example, a user can provide the spoken utterance, "Tell me more about her", when the GUI element has been dragged closer to an image of Aung San Suu. In response, the generative output can provide details about Aung San Suu, and/or the context in which Aung San Suu's image is presented (e.g., a context of the user and/or a context depicted with the object). In this way, the user can receive detailed and accurate responses to natural language inputs without having to describe any perceived content (e.g., objects that the user is viewing) in great detail. This can preserve computational resources at any device that may be employed for providing generative outputs, since such devices would be less-frequently processing extensive natural language inputs describing detailed input requests. Instead, natural language inputs captured by input data (e.g., audio, video, text, etc.) can be less detailed and/or shorter in duration, thereby needing less computational bandwidth to process. Furthermore, the inputs utilized to provide generative output can be more readily processed as a result of a GUI element being employed to identify a rendered or tangible object to be the subject processing using a generative model, rather than using a non-specific region of space or content.

In some implementations, the GUI element can exhibit fluid-like behavior and/or can be rendered to have a globular appearance, e.g., akin to a bubble, cloud, or small amount of fluid (e.g., a droplet) deposited on a surface (e.g., the screen). For example, the GUI element can be configured to exhibit behavior that appears hydrophilic, hydrophobic, responsive to cohesion of a virtual or rendered object, responsive to surface tension, and/or otherwise responsive in a fluid-like manner. This behavior can be exhibited as a user interacts with the GUI element via one or more interfaces of one or more computing devices (e.g., via a single modality or multiple modalities) and/or otherwise when certain objects appear at or near the GUI element, at least from the perspective of that user who is viewing the object via a graphical user interface. For example, when a tangible object and/or a rendered object appears in a visual field (i.e., field of view) of a user, one or more of the GUI elements can dynamically and visibly change.

In some implementations, a visible change of a GUI element can cause the GUI element to exhibit hydrophilic, hydrophobic, and/or other fluid-like behavior. In some implementations, the visible change of the GUI element can depend on other factors, such as other inputs detected by a computing device that is rendering the GUI element, context of the user operating the computing device, etc. For example, one or more sensors of the computing device, or another computing device, can detect a gaze of the user (with prior express permission from the user), and this direction of gaze can serve as a basis for one or more element features exhibits by a GUI element. In some implementations, when a user is determined to be gazing more towards a particular GUI element, that particular GUI element can exhibit a particular type of fluid behavior. Alternatively, or additionally, when the user is determined to be gazing away from a GUI element, that GUI element can exhibit a different type of fluid behavior.

In some implementations, these other inputs can influence the generative output that is provided in response the user providing a natural language input that is directed to one or more objects and/or one or more GUI elements. For example, other contextual data (e.g., of the user, such as their location, time-of-day, official title, general preferences, etc.), bodily movements, and/or other features or context of interactions between the user and the computing device can be utilized, with prior express permission from the user, to determine an amount of detail to provide in the generative output, types of content to provide in the generative output (e.g., audio, visual, haptic, etc.), a duration of the generative output, one or more models to use for generating the generative output, and/or any other property of the generative output.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 illustrates a system that includes an application and/or automated assistant that can provide generative output based on placement and/or element features of one or more GUI elements and a user input directed to receiving the generative output.

DETAILED DESCRIPTION

Multiple figures herein depict situations in which disclosed techniques are implemented on augmented reality devices. However, this is not meant to be limiting. Techniques described herein may be implemented on any display device, including 2D and/or 3D display devices that present entirely rendered content. For example, techniques described herein may enable dragging of a GUI element configured with selected aspects of the present disclosure to various objects that are rendered on a display of a smartphone or tablet. These objects may be presented as part of any application, such as a web browser, game, social news aggregation application, social media application, and so forth, and may include, for instance, textual snippets (e.g., words, whole sentences, whole paragraphs), images, interactive elements (e.g., buttons, radio boxes, pull down menus), text fields, videos, symbols and/or icons (e.g., file and/or folder icons rendered as part of a filesystem explorer application), and so forth.

GUI elements configured with selected aspects of the present disclosure may be moved in various ways. On a 2D display, for instance, a user may operate a mouse or directional keys on a keyboard to cause the GUI element to move. If the 2D display is a touchscreen, the user may touch the GUI element using a digit and drag the GUI element to a desired location, e.g., onto or adjacent an object of interest. If the display is part of mobile computing device such as a smartphone or tablet computer, in some cases, other types of inputs may used to move the GUI element. For instance, tilting the mobile device, which may be detected using sensors such as a gyroscope and/or accelerometer, may cause the GUI element to move (e.g., dribble, slide) across the screen.

Figure 1A:
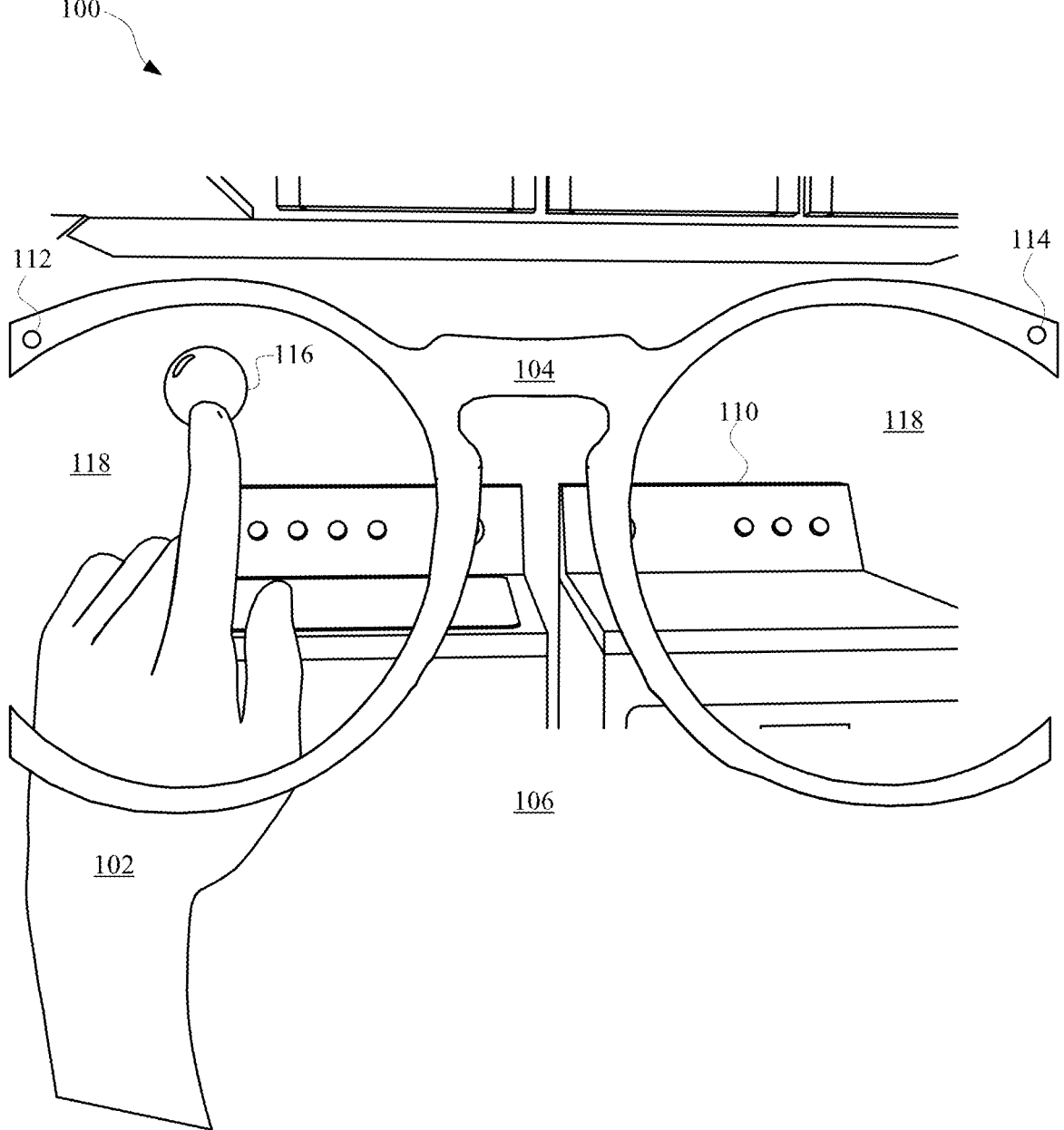
FIG. 1A, FIG. 1B and FIG. 1C illustrate views of a user interacting with a GUI element to specify subject matter for a request for generative output.
Figure 1B:
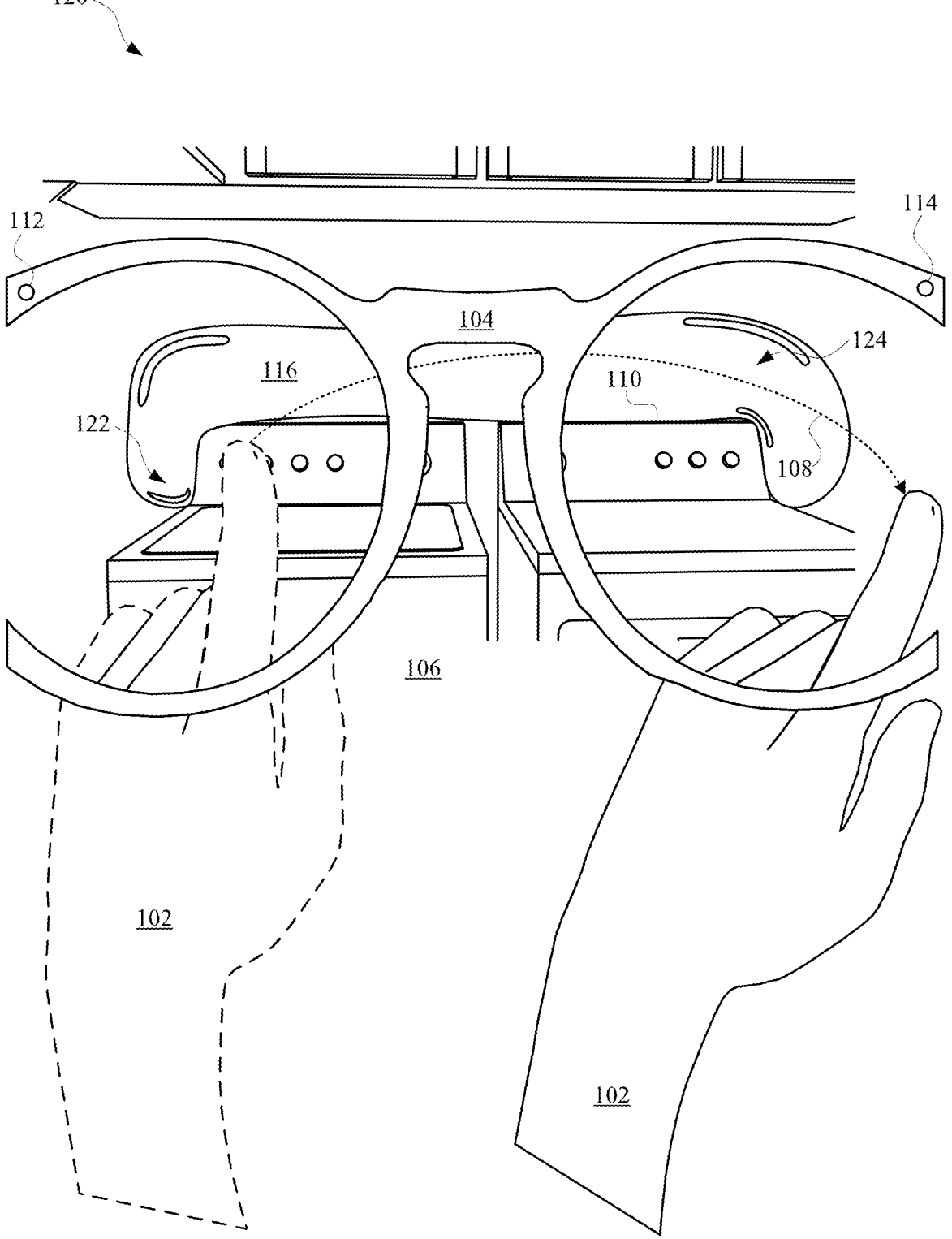
Figure 1C:
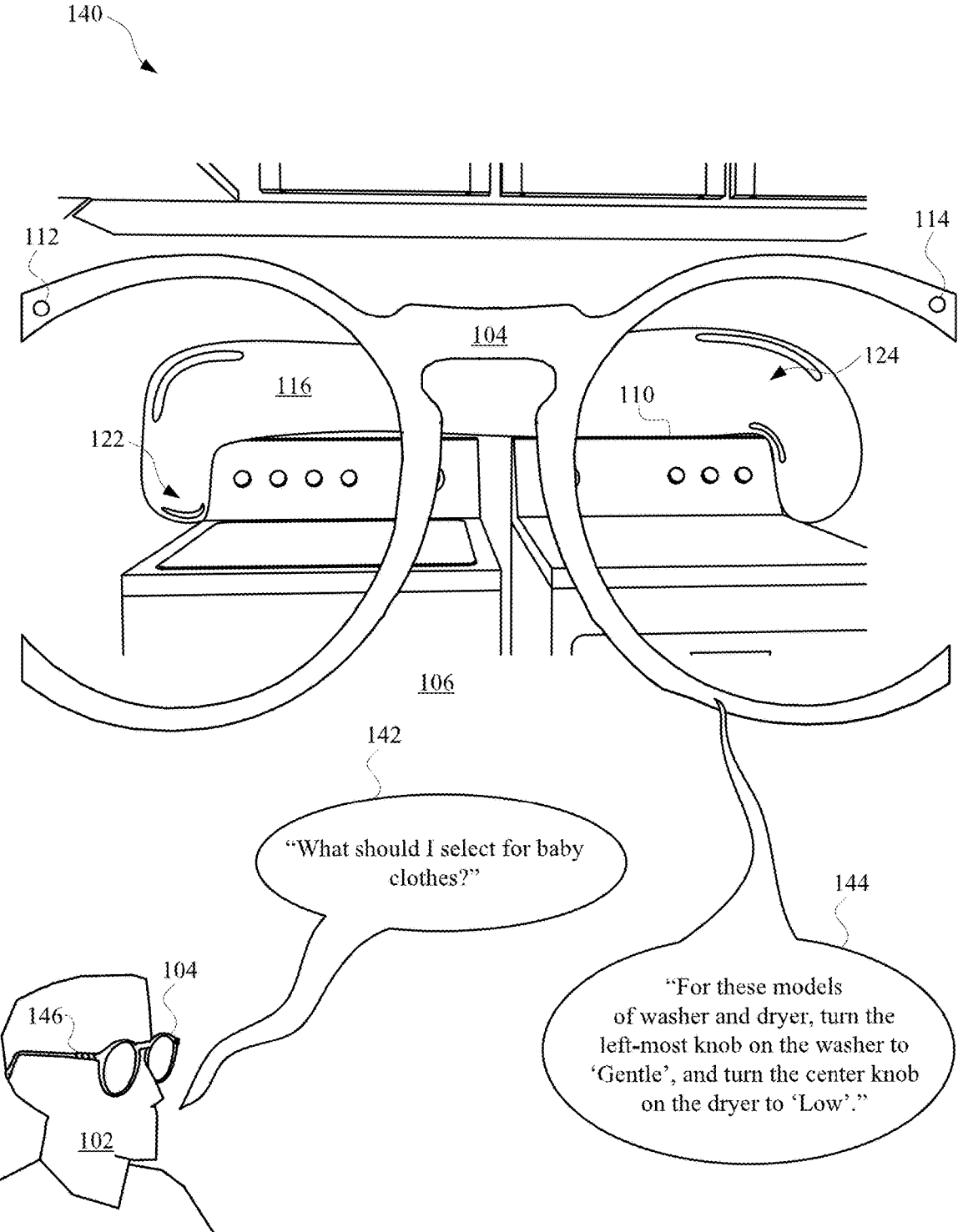

FIG. 1A, FIG. 1B and FIG. 1C illustrate a view 100, a view 120, and a view 140, respectively, of a user 102 interacting with a GUI element 116 to specify subject matter for a request for generative output. In some implementations, the user 102 can be wearing the computing device 104 while performing various activities. The computing device 104 can be, for example, a wearable device or non-wearable device that can provide augmented reality and/or virtual reality at a display interface 118 of the computing device 104. In some implementations, the GUI element 116 can be rendered at the display interface 118 by default, and/or in response to a user performing a gesture that can be detectable by the computing device 104 and/or another device. For example, the user 102 can raise their left hand, as illustrated in FIG. 1A, and a sensor 112 and/or 114 of the computing device 104 can receive gesture input that can indicate an intent of the user 102 to interact with the GUI element 116.

In some implementations, the sensor 112 can be a forward-facing camera, and the sensor 114 can be a reverse facing camera that can be used for determining facial features and/or expressions of the user 102, with prior express permission from the user 102. In this way, a gesture of the user 102 can be detected using the forward-facing camera, and optional data generated using the rear-facing camera can confirm an intent of the user to perform the gesture. For example, when the user 102 raises their eyebrows, adjusts their gaze, and/or otherwise positively indicates an intent to perform a gesture, and a gesture is also detected, the computing device 104 can be responsive to the gesture.

In some implementations, the GUI element 116 can appear at a default location of the display interface 118 and/or at a position of an extremity of the user 102, as detected by one or more sensors of the computer device 104. For example, and as illustrated in FIG. 1A, when the user 102 raises their left hand and extends their index finger, the GUI element 116 can appear at the display interface 118 at or near the end of their index finger. The user 102 can then further interact with the GUI element to adjust one or more element features of the GUI element 116. For example, and as illustrated in view 120 of FIG. 1B, the user 102 can perform a gesture that causes the GUI element 116 to appear to stretch across one or more tangible objects in the physical environment of the user 102. In some implementations, a gesture 108 can be performed with one hand or two hands, and various properties of the gesture 108 can be determined for providing a response that the user 102 may desire.

For example, the user 102 may have raised their index finger and held it in place at the location of the rendered GUI element 116, and then slowly, and/or at a relatively steady velocity, dragged GUI element 116 across a perimeter of one or more tangible objects, such as a washer and a dryer. In response to this particular gesture 108, the first portion 122 of the GUI element 116 can appear to mimic a shape of a tangible object, and a second portion 124 of the GUI element 116 can appear to rest on top of the one or more tangible objects (at least when viewed through the computing device 104 interface). This can give feedback to the user 102 that the gesture 108 is accurately being responded to, and/or that the GUI element 116 is otherwise being associated with the desired object of interest.

In some implementations, the user 102 can perform the gesture 108 in a different way to cause a different result. For example, the user 102 can more quickly relocate the GUI element 116 to cause the GUI element 116 to relocate to one of the washer or the dryer, and also stay in a circular shape. As a result, the object of interest can be the washer or the dryer, thereby causing either machine to be the subject of a spoken utterance. In some implementations, the user 102 can turn their head away from the one or more objects and the GUI element 116 can appear to virtually remain in place relative to the one or more objects. For example, when the user 102 turns their handed 180°, thereby causing the computing device 104 to face the opposite direction, the computing device 104 and/or a remote device can store element data indicating element features of the GUI element 116. Thereafter, when the user 102 turns around to, again, face the one or more objects (e.g., the washer and dryer), the GUI element 116 can appear be in the same position as the user 102 left the GUI element 116, unless otherwise specified by the user 102.

In some implementations, and in response to the gesture 108, the computing device 104 and/or one or more other remote devices, can process image data captured by one or more sensors of the computing device 104, and/or one or more other devices. The image data can embody visual features of the one or more objects, such as the washer and dryer that the GUI element 116 appears to be resting on. The image data can be cropped from a larger image of the environment of the user 102, thereby limiting processing of the image data to objects of interest rather than an entire environment 106 of the user 102. Alternatively, or additionally, image data that also characterizes portions of the environment 106 can also be processed with image data that embodies or otherwise characterizes features of any objects of interest (e.g., one or more objects that the user 102 directed one or more GUI elements toward or away from). The image data can be processed by one or more trained machine learning models to identify various features of the objects of interest. As a result of this processing, object data can be generated and reused when the user 102 provides a request for generative output regarding any objects of interest.

For example, the user 102 can provide a spoken utterance 142 such as, "What should I select for baby clothes?" This inquiry can solicit information regarding how to use the specific washer and dryer in the environment 106 to wash baby clothes. In response, an automated assistant application, or other application, can process natural language data characterizing the spoken utterance 142 from the user 102, and also process the object data associated with the GUI element 116. The object data and the natural language data can be processed by one or more generative models to provide an accurate response for the user 102, despite the spoken utterance 142 being relatively ambiguous. In other words, without the context of the environment 106 and/or object data characterizing the washer and dryer in the environment 106, the spoken utterance 142 could result in very distinct responses depending on the user 102 providing the spoken utterance 142. In response to processing the spoken utterance and the object data, the automated assistant can provide a generative output 144 such as, "For these models of washer and dryer, turn the left-most knob on the washer to 'Gentle', and turn the center knob on the dryer to 'Low'."

Allowing the user 102 to perform a gesture to maneuver a GUI element 116 to indicate an object of interest, the user 102 can receive more accurate generative outputs from an automated assistant, and without requiring the user 102 to provide overly detailed spoken utterances. This can preserve computational resources, as a number of turns between the user 102 and the automated assistant would be reduced, thereby reducing a number of transactions to process. This can ultimately reduce the amount of data sent over a network and reduce a number of instances of audio data to process. This can also ensure that the user 102 does not necessarily need to provide extensive details in their assistant inputs but, rather, can rely on the automated assistant to discern a subject matter of a request based on how the user 102 has interacted with one or more GUI elements 116.

FIG. 2A, FIG. 2B, FIG. 2C, and FIG. 2D illustrate a view 200, a view 220, a view 240, and a view 260 of a user 202 interacting with one or more GUI elements in furtherance of causing generative output to be based on any objects associated with the one or more GUI elements. The appearance of a first GUI element 216 and a second GUI element 218 can be what is perceived by the user 202 when they are wearing a wearable computing device to view their environment 206 with some augmented reality graphics. Alternatively, or additionally, the first GUI element 216 and the second GUI element 218 can be view at GUI rendered at a computing device 204 that has a camera facing the environment 206 of the user 202. Using this computing 204, the user 202 can interact with GUI elements rendered at a display interface of the computing device 204 to cause one or more different objects, or one or more portions of objects, to be considered as supplemental to any request for generative content from the user 202.

For example, the user 202 can be viewing a rendering of a portion 222 of their environment 206, as captured by a camera of their computing device 204 (e.g., the portion 222 of the environment 206 can be what is rendered at the display interface of the computing device 204, and thus shows the GUI elements that the user 202 can interact with). The user 202 can cause one or more GUI elements to appear at the display interface of the computing device 204 by providing an input to the computing device 204, or the one or more GUI elements can appear at the display interface by default (e.g., as part of a home screen, displayed at startup, etc.). The user 202 can interact with each respective GUI element by providing a touch input to the computing device, a spoken utterance to the computing device, and/or any other type of input to the computing device.

For example, in anticipation of controlling one or more smart devices in the home of the user 202, the user 202 can perform a gesture to drag a first GUI element 216 a rendered location of a smart speaker 210 and a second GUI element 218 to a rendered location of a smart display 212. In this way, the user 202 can indicate a subset of devices to control with a subsequent, ongoing, or prior spoken utterance, thereby omitting consideration of other devices such as a smart television 208 that is also in the environment 206. By eliminating the need for the user 202 to provide a much longer spoken utterance that identifies all the devices to be controlled and all the devices that should not be controlled, processing bandwidth and memory can be preserved at the computing device 204, as the audio of such a long, spoken utterance would not need to be processed.

Figure 2A:
FIG. 2A, FIG. 2B, FIG. 2C, and FIG. 2D illustrate views of a user interacting with one or more GUI elements in furtherance of causing generative output to be based on any objects associated with the one or more GUI elements.
Figure 2B:
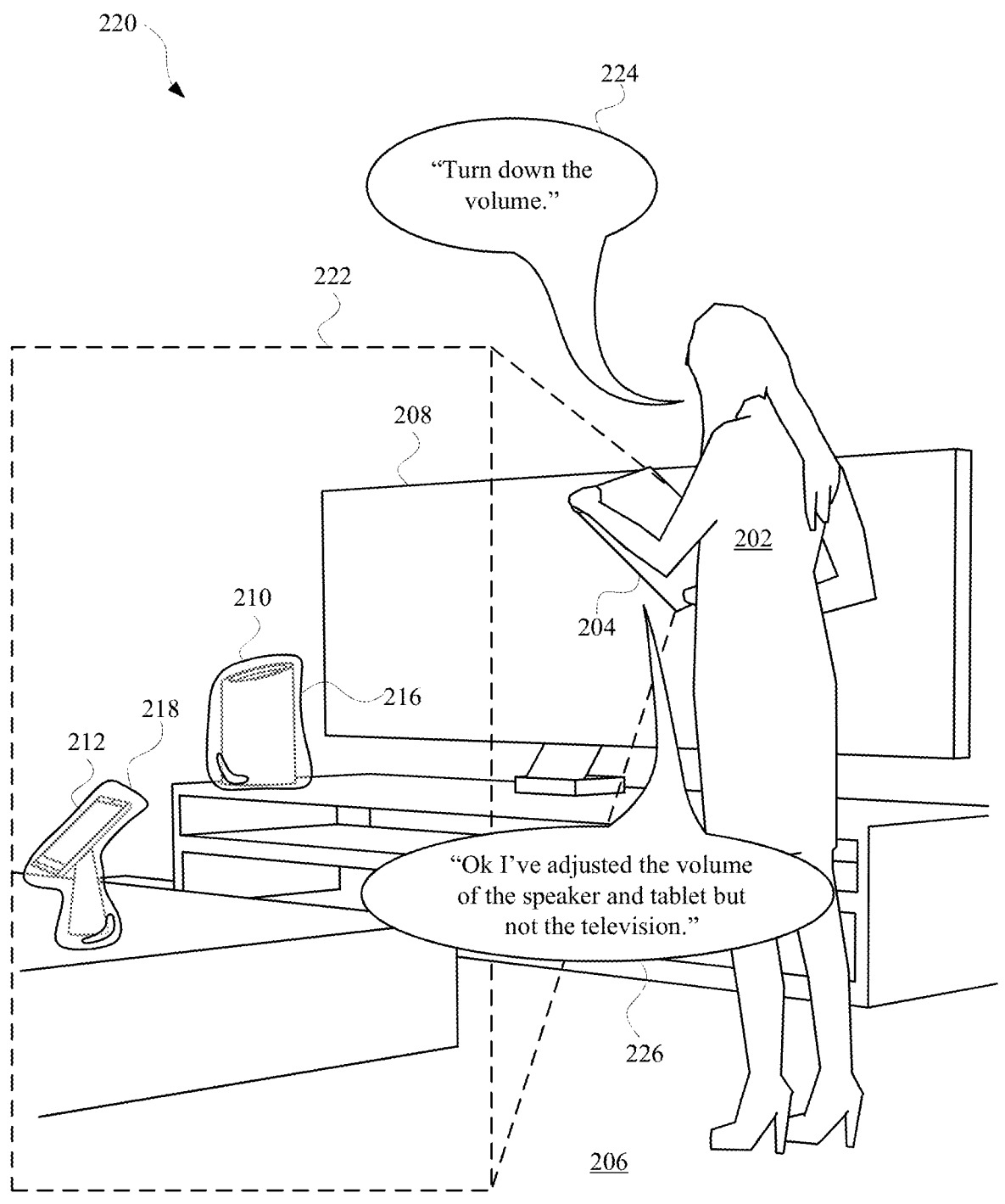

In some implementations, and as illustrated in FIG. 2B, the first GUI 216 element can exhibit fluid-like behavior relative to an object that the user 202 maneuvered the first GUI element 216 towards or away from. For example, the first GUI element 216 can exhibit hydrophilic behavior relative to the smart speaker 210, thereby causing the first GUI element 216 to resemble a puddle of water that is being absorbed by, or otherwise being relocated to, the area corresponding to the rendering of the image of the smart speaker 210. Similarly, the second GUI element 218 can also exhibit fluid-like behavior relative to the smart display 212. Furthermore, the second GUI element 218 can exhibit hydrophobic behavior relative to the first GUI element 216 and/or any other tangible or rendered features associated with the environment 206 of the user 202 and/or the corresponding rendering of any objects or features at the display interface of the computing device 204. For example, the second GUI element can curve inward toward the smart display 212 while curving away from the smart television 208 and/or the smart speaker 210. In some implementations, the fluid behavior of each GUI element can be dynamic, and/or exhibited in real time, as the user 202 is interacting with each GUI element. In this way, feedback can be given to the user 202 to indicate that the object desired to be the subject of a spoken utterance has been accurately selected via a GUI element.

Once the GUI elements have been placed in a suitable arrangement within the rendered portion 222 at the display interface, the user 202 can provide a spoken utterance 224 in furtherance of controlling the selected devices. For example, the user 202 can provide a spoken utterance 224 such as, "Turn down the volume", in furtherance of causing an automated assistant, or other application, to control the volume of the smart speaker 210 and the smart display 212. Processing can then be undertaken to determine the devices that the user 202 is referring to.

For example, in furtherance of disambiguating the spoken utterance 224, an image corresponding to the portion 222 of the environment 206 can be processed to isolate portions of the image that include objects appearing to be associated with (positively or negatively) the GUI elements. For example, one or more images can be generated from an initial image (e.g., an image depicting the portion 222 of the environment 206) to isolate an image of smart speaker 210 and an image of the smart display 212. One or more image recognition processes can then be performed to identify each object associated with each respective GUI element. For example, the brands and model names for the smart speaker 210 and the smart display 212 can be determined and converted into textual data. This textual data can then be combined with the transcript of the spoken utterance 224 and/or other data generated from the spoken utterance 224 when providing generative output in response to the spoken utterance 224.

For example, a large language model (LLM) can be utilized to generate a natural language request that combines content of the spoken utterance 224 with any names or descriptions for the objects, or portion of an object, selected via the GUI elements. Alternatively, or additionally, embedding data can be generated for the spoken utterance 224 and for the objects selected via the GUI elements. The embedding data can then be processed using one or more generative models to provide generative output and/or an automated assistant response for the spoken utterance 224. For example, a supplemented assistant request can be generated based on the spoken utterance 224 and the selected objects, and this supplemented assistant request can be processed by an automated assistant application and/or other application. In the example set forth in FIG. 2B, this can result in volume settings for the smart speaker 210 and the smart display 212 being adjusted. Optionally, the automated assistant can provide a natural language output 226 indicating the response of the automated assistant to the spoken utterance 224 and the interaction with the GUI elements. The natural language output can be, for example, "Ok. I've adjusted the volume of the speaker and tablet, but not the television." In this way, the user 202 can be on notice of how the automated assistant utilized object data generated in response to the user 202 interacting with the GUI elements to select the smart speaker 210 and the smart display 212.

Alternatively, or additionally, training data can be generated based on this interaction with the user 202, and with prior permission from the user 202, in furtherance of training one or more models that are particular to the user 202 and their interactions with GUI elements. In this way, each device user can have unique responses to their respective interactions with the GUI elements over time, thereby facilitating more accurate and helpful interactions with their devices. For example, a first user can use two fingers to stretch a respective GU element at a determined velocity to cause the GUI element to separate into two different GUI elements. Similarly, a second user can use two fingers to stretch a respective element at a steady velocity to cause the GUI element to stretch or otherwise spread out like a fluid across a display interface (e.g., seemingly remaining as a single GUI element). These two distinct responses can be the result of feedback generated based on the first user relocating the separated GUI elements towards two different objects and the second user stretching the GUI element over a single object.

In some implementations, confirmation of how a particular GUI element is desired to react to an interaction can be confirmed or rejected based on other data detected by a computing device 204. This can include information regarding a physical reaction of the user 202, including, but not limited to, a difference in facial expression, gesture, audible noise, and/or any other feedback that a user can provide to a device. By further training models based on particular user interactions with GUI elements, the user 202 will not necessarily need to provide extensive spoken utterances with great detail regarding their requests, but rather, can rely on interacting with one or more GUI elements to help provide any context or other supplemental information for simpler requests. This can improve responses from applications, especially in circumstances involving multiple devices in an environment 206, and can preserve power and other computational resources by reducing instances of false positives at affected devices.

Figure 2C:
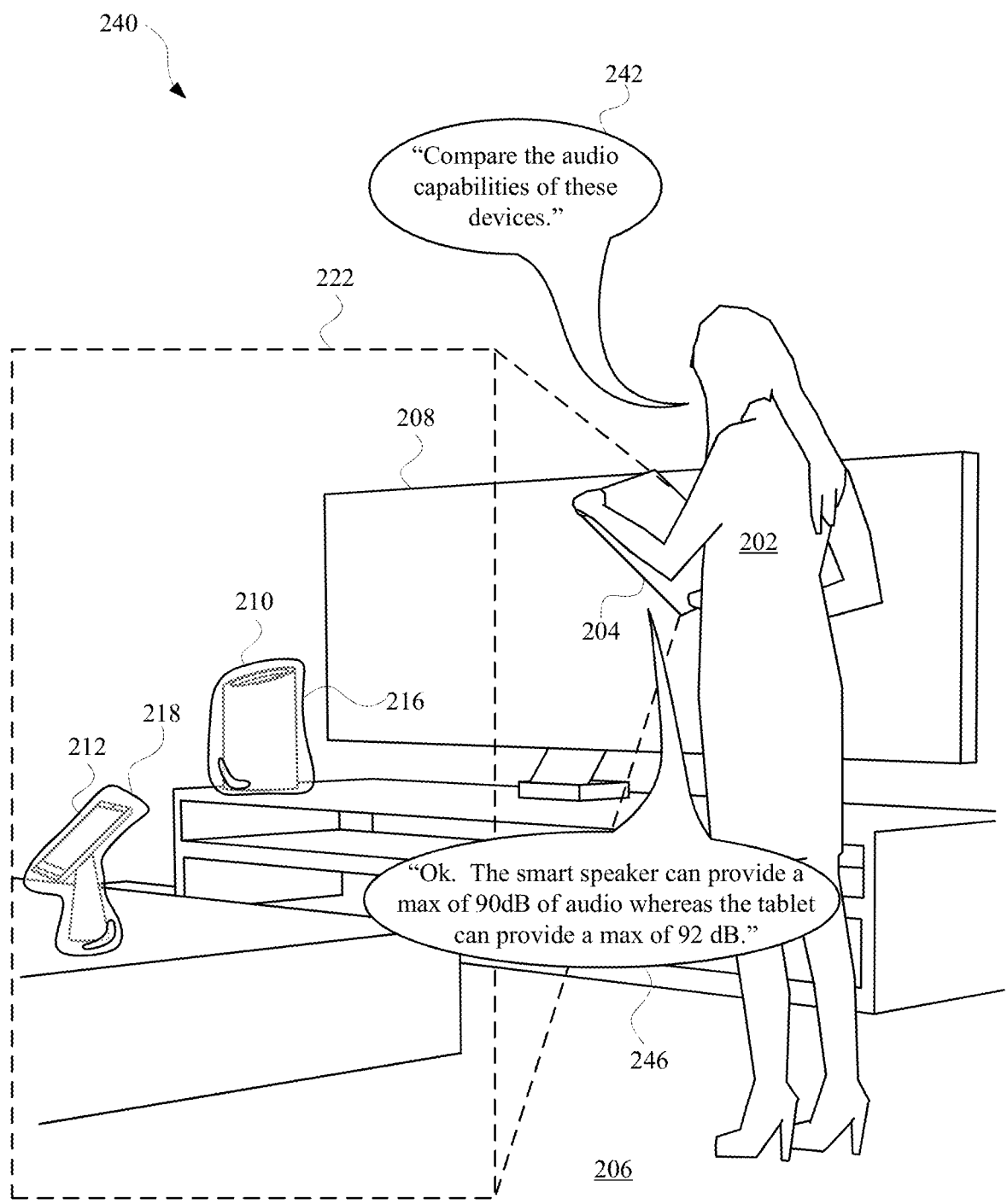

FIG. 2C illustrates a view 240 of an alternative instance of the user 202 interacting with the GUI elements wherein the user 202 has relocated the first GUI element 216 and the second GUI element 218 to be associated with the smart speaker 210 and the smart display 212, respectively. In view 240 of FIG. 2C, the user 202 provides a spoken utterance 264 such as, "Compare the audio capabilities of these devices," in furtherance of causing an automated assistant to provide a natural language output that indicates differences in specifications and/or features of the two devices associated with the GUI elements. For example, the smart speaker 210 can offer a max audio output that is different from a max audio output of the smart display 212. Therefore, and in response, the automated assistant can provide a natural language output 246 indicating that "The smart speaker can provide a max of 90 dB of audio whereas the tablet can provide a max of 92 dB." In this way, the user 202 can provide a relatively simple spoken utterance that can be disambiguated by their interaction with the GUI elements.

Figure 2D:
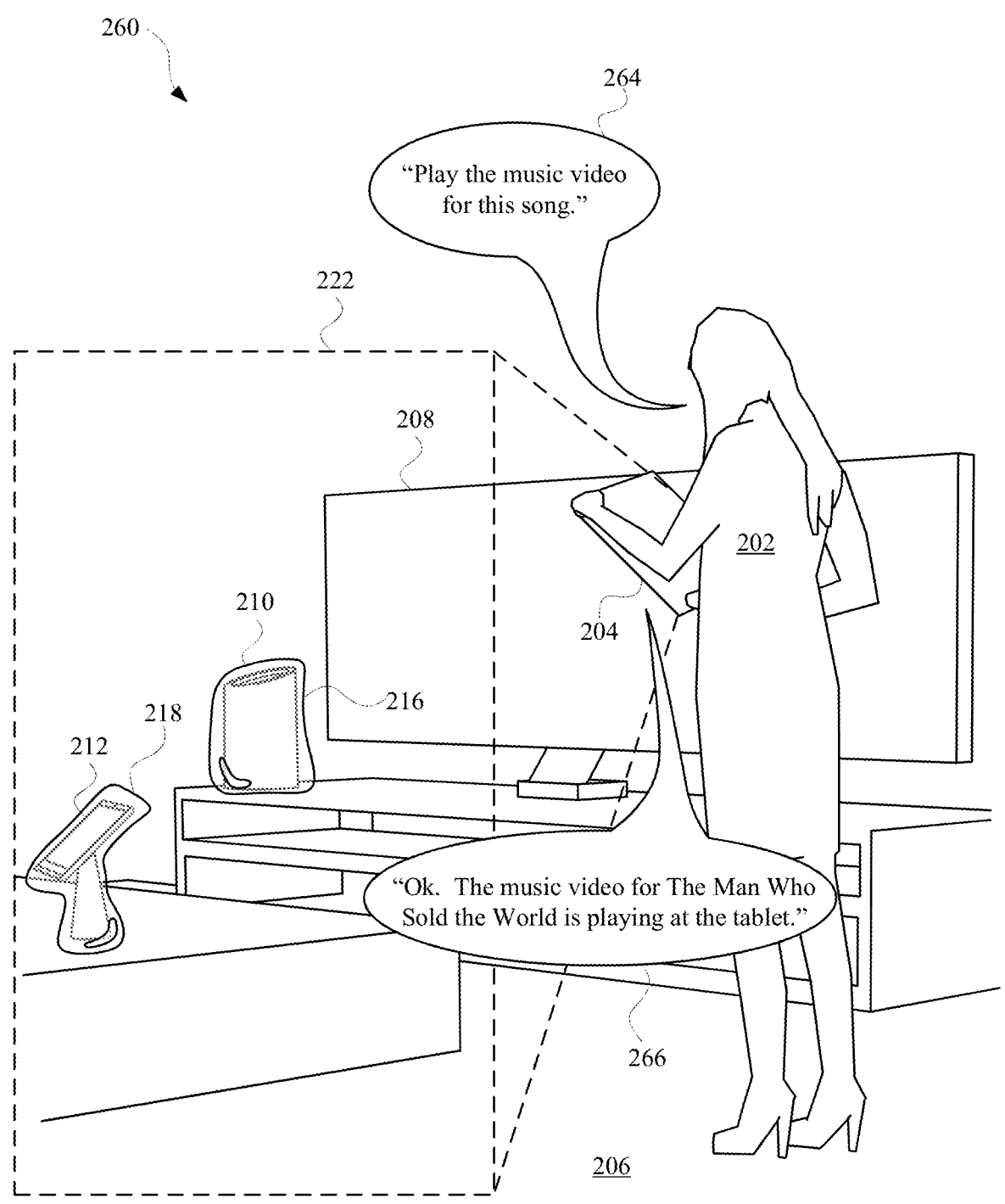

FIG. 2D illustrates an alternative instance of the user 202 interacting with the GUI elements wherein the user 202 has relocated the first GUI element 216 and the second GUI element 218 to be associated with the smart speaker 210 and the smart display 212, respectively. In view 260 of FIG. 2D, the user 202 provides a spoken utterance 264 such as, "Play the music video from this song," in furtherance of requesting an automated assistant to play a music video at the smart display 212 for the music playing at the smart speaker 210. For example, the smart speaker 210 can be playing audio for the song "The Man Who Sold the World", and in response to the user 202 providing the spoken utterance 264, the smart display 212 can be caused to play the corresponding music video for that song. In response to the spoken utterance 264, the automated assistant can optionally provide a natural language output 266 that indicates "The music video for The Man Who Sold the World is playing at the tablet." In this way, the user 202 can provide a relatively simple spoken utterance that can be disambiguated by their interaction with the GUI elements.

FIG. 3 illustrates a system 300 that includes an application and/or automated assistant 304 that can provide generative output based on placement and/or element features of one or more GUI elements and a user input directed to receiving the generative output. In some implementations, all or some aspects of the system 300 can be implemented locally at the computing device 302. In additional or alternative implementations, all or some aspects of the system 300 can be implemented remotely from the computing device 302 (e.g., at remote server(s)). In those implementations, the computing device 302 and the system 300 can be communicatively coupled with each other via one or more networks, such as one or more wired or wireless local area networks ("LANs," including Wi-Fi LANs, mesh networks, Bluetooth, near-field communication, etc.) or wide area networks ("WANs", including the Internet).

The computing device 302 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The computing device 302 can execute one or more applications, such as application 334, via which queries can be submitted and/or natural language ("NL") based summaries and/or other response(s) to the query can be rendered (e.g., audibly and/or visually). The application 334 can be an application that is separate from an operating system of the computing device 302 (e.g., one installed "on top" of the operating system)—or can alternatively be implemented directly by the operating system of the computing device 302. For example, the application 334 can be a web browser installed on top of the operating system, or can be an application that is integrated as part of the operating system functionality. The application 334 can interact with the system 300.

In various implementations, the computing device 302 can include an input processing engine 306 that is configured to detect user input provided by a user of the computing device 302 using one or more user input interfaces. For example, the computing device 302 can be equipped with one or more microphones that capture audio data, such as audio data corresponding to spoken utterances of the user or other sounds in an environment of the computing device 302. Additionally, or alternatively, the computing device 302 can be equipped with one or more vision components that are configured to capture vision data corresponding to images and/or movements (e.g., gestures) detected in a field of view of one or more of the vision components. Additionally, or alternatively, the computing device 302 can be equipped with one or more touch sensitive components (e.g., a keyboard and mouse, a stylus, a touch screen, a touch panel, one or more hardware buttons, etc.) that are configured to capture signal(s) corresponding to touch input directed to the computing device 302.

Some instances of a query or request described herein can be a query or request that is formulated based on user input provided by a user of the computing device 302 and detected via input processing engine 306. For example, the query or request can be a typed query or request that is typed via a physical or virtual keyboard, a suggested query or request that is selected via a touch screen or a mouse, a spoken voice query or request that is detected via microphone(s) of the client device, or an image query or request that is based on an image captured by a vision component of the client device.

In various implementations, the computing device 302 can include an output generating engine 314 that is configured to provide model-generated content for audible and/or visual presentation to a user of the computing device 302 using one or more user interfaces 320. For example, the computing device 302 can be equipped with one or more speakers that enable content to be provided for audible presentation to the user via the computing device 302. Additionally, or alternatively, the computing device 302 can be equipped with a display or projector that enables content to be provided for visual presentation to the user via the computing device 302. In some implementations, the display may be part of a head-mounted display (HMD) and the display can be at least partially transparent or not transparent.

In some implementations, output generating engine 314 may be configured to generate rendered content based on raw generative output. For example, a generative model response may include a sequence of tokens that is operable by output generating engine 314 to render audible and/or visual output. In some implementations, this sequence of tokens may include a sequence of raw text. Some parts of the sequence of raw text may include meaningful content that is responsive to a user's query or request, as well as object data characterizing one or more objects that a user has specified by interacting with one or more GUI elements. In some implementations, the object data can characterize a location of an object, a location of a feature of an object, and/or other information describing the object. Alternatively, or additionally, object data can include information obtained via an internet search and/or provided by a generative output (e.g., generative output provided using an image processing model), and/or provided using a heuristic processes for analyzing a portion of an image.

Other parts of the sequence of text may include metadata instructions (e.g., symbols) that are usable, e.g., by output generating engine 314, to cause the meaningful content to be rendered in a particular way (e.g., with selected fonts, line breaks, images, formatting, etc.). In some implementations, output generating engine 314 may also be configured to create a mapping between raw generative output and the downstream rendered content that is generated based on the raw generative output, input gesture directed to a GUI element, and/or another input.

In various implementations, the computing device 302 can include a gesture processing engine 318 that is configured to determine an input gesture provided by a user, and/or any other context (e.g., current or recent context) of the computing device 302 and/or of a user of the computing device 302. In a multi-turn dialog session between the user and an automated assistant (alternatively, "virtual assistant", "chatbot", etc.), the context of the client device and/or user may be maintained over multiple turns as a "user state" to determine how to accurately respond to an input gesture from the user. In some implementations, this context can also be based on object data and/or element data that is generated in response to a user interacting with one or more GUI elements for specifying an object of interest.

In some implementations, the gesture processing engine 318 can determine one or more gestures provided by a user, along with any context, and/or user state, utilizing interface input data, data characterizing current or recent interaction(s) via the computing device 302, a location of the computing device 302, a location of a GUI element, one or more features of the GUI element, one or more changes to the GUI element over time, profile data of a profile of a user of the computing device 302 (e.g., an active user when multiple profiles are associated with the computing device 302), and/or other input data accessible to the gesture processing engine 318, and with prior permission from the user. For example, the gesture processing engine 318 can determine whether a user is intending to cause a GUI element to be relocated near a tangible object and/or a rendered object that is visible to the user.

As another example, the gesture processing engine 318 can determine a particular gesture, a type of gesture, and/or features of a gesture, based on which application is active in the foreground of the computing device 302, a current or recent state of the active application, and/or content currently or recently rendered by the active application. A context determined by the gesture processing engine 318 can be utilized, for example, in supplementing or rewriting a query or request that is formulated based on user input gesture, in generating an implied query or request (e.g., a query or request formulated independent of user input), and/or in determining to submit an implied query/request and/or to render result(s) for an implied query/request or gesture. The user's context can be based on interaction with one or more GUI elements rendered at a user interface 320, e.g., a GUI element rendered at an augmented reality display, a GUI element rendered at a virtual reality display, and/or a GUI element rendered via any other interface 320.

In various implementations, computing device 302 can include an object selection engine 316 that is configured to determine gesture selection of one or more GUI elements generate to generate object data. In some implementations, output generating engine 314 may utilize the object data and any assistant input to provide generative output. In various implementations, object selection engine 316 may provide data indicative of one or more objects that one or more GUI elements have been arranged to appear located at or near the one or more objects. In some instances, the object selection engine 316 can determine one or more features of the GUI elements when a user interacts with them and generate the object data according to the feature of the GUI elements. For example, and for each GUI element, an acceleration, velocity, transparency, color, area, volume, and/or any other characteristic can be utilized to determine the amount of object data to generate, and amount of detail to include in the object data, and/or any other property for the object data.

In some implementations, a transparency or color of a GUI element can be adjusted to indicate a type of information the user may be interested in with respect to a particular object that the GUI element may be relocated near. For example, a modification to a transparency of a GUI element can indicate that the user is interested in more than just a name for an object, whereas a non-transparent GUI element being relocated near an object may indicate that the user is interested in the name for the object to be considered with a request for generative output. Alternatively, or additionally, when a user changes a color of a GUI element to green, the user may be expressing interest in any health data regarding a particular object, whereas when a user changes the color of a GUI element to red, the user may be expressing interest in an origin of the object. Alternatively, or additionally, any other change to a property or feature of a GUI element can indicate different interests of a user in various implementations.

Further, the computing device 302 and/or the system 300 can include one or more memories for storage of data and/or software applications, one or more processors for accessing data and executing the software applications, and/or other components that facilitate communication over one or more of the networks. In some implementations, one or more of the software applications can be installed locally at the computing device 302, whereas in other implementations one or more of the software applications can be hosted remotely (e.g., by one or more servers) and can be accessible by the computing device 302 over one or more of the networks.

Although aspects of computing devices 302, 104, and 204 are illustrated or described with respect to a single client device having a single user, it should be understood that is for the sake of example and is not meant to be limiting. For example, one or more additional client devices of a user and/or of additional user(s) can also implement the techniques described herein. For instance, the computing device 302, the one or more additional client devices, and/or any other computing devices of a user can form a coordinated ecosystem of devices that can employ techniques described herein. These additional client devices and/or computing devices may be in communication with the computing device 302 (e.g., over a network(s)). As another example, a given client device can be utilized by multiple users in a shared setting (e.g., a group of users, a household).

In some implementations, a model selection engine 326 is provided to select zero, one or more generative models from multiple candidate generative models (e.g., LLMs, vision language models or "VLMs," multi-modal models, image generation models such as image diffusion models, transformer-based models, sequent-to-sequence models, encoder-decoder architectures, and/or other models). For example, in some iterations in which a user interacts with a GUI element for receiving generative content about an object, the system will determine to not utilize any of the candidate generative models, in some iterations the system will determine to utilize only one of the candidate generative models, and in some iterations the system will determine to utilize multiple of the candidate generative models. Model selection engine 326 can optionally utilize one or more rules and/or one or more classifiers that are trained to generate output identifying which models are best suited to generate a response to a current query or request, given a selection of an object(s) and an assistant request (e.g., a spoken utterance to the automated assistant provided before, during, or after a user interacts with a GUI element).

The model input engine 322 may be configured to assemble model input prompts based on data such as a current query, input gesture, interaction with a GUI element, object data, generative output, modified generative output, current user state/context, past queries, past model responses (which may be included in the current user state/context), portions of past rendered generative outputs that are selected by users for modification, etc. Model input prompts may, in some implementations, include a sequence of tokens, which may be words, phrases, or embeddings generated from data such as text, images, audio, GUI element features, etc. For example, input data can be processed using one or more generative models and/or any other suitable model to generate a gesture embedding and/or object embedding from an input gesture. A correlation between the embedding and one or more existing embeddings (e.g., mapped in a latent space) can be determined. When the correlation satisfies one or more parameters for determining an adequate correlation (e.g., latent distance between embeddings satisfies threshold distance), one or more particular modification operations and/or one or more particular instances of object data corresponding to the closest existing embedding can be selected to fulfill the input gesture (e.g., a gesture for relocating, stretching, separating, and/or otherwise modifying one or more GUI elements). In some implementations, draft modified generative outputs can be pre-emptively generated for certain inputs in furtherance of reducing latency that may occur between a user providing an input and the modified generative output being rendered.

In some implementations, a generative output engine 324 may be configured to apply one or more models stored in model data 332 to model input prompts generated by model input engine 322 to generate a model response. A model response may take various forms, such as a sequence of tokens that correspond to, represent, or directly convey words, phrases, embeddings, etc. Generative models stored in model data 332 may take a variety of forms, such as PaLM, BARD, BERT, LaMDA, Meena, GPT, and/or any other model, such as any other model that is encoder-only based, decoder-only based, sequence-to-sequence based and that optionally includes an attention mechanism or other memory. Vision language models (VLMs) capable of processing images and text may be included as well. Generative models stored in model data 332 may have thousands of parameters, millions of parameters, billions of parameters, or more.

Object selection engine 316 may be configured to extract information about a particular object or objects that correspond with a selected object that is tangible in a reality of a user and/or virtually rendered via an interface of the computing device 302. As noted previously, in some implementations, object selection engine 316 may determine this information based on mapping one or more GUI element features to data rendered or otherwise available via the computing device 302 or a separate computing device. For example, an object selection engine 316 may provide starting and/or ending positions for a GUI element, and an object selection engine 316 can determine whether the GUI element is being interacted with to stretch around multiple objects or to remain unstretched but relocated to be near an object of interest. Images of the object or objects can then be processed to determine information about the object or objects.

The object selection engine 316 may be configured to further process any information obtained about an object, in order to supplement a user request for generative content. For example, suppose a user selects two portions of a website using two GUI elements. In response, images of any content rendered at the website can be extracted by object selection engine 316 and incorporated into a subsequent model input prompt by model input engine 322. This subsequent model input prompt may also include the user's request to compare objects identified using the two GUI elements. For example, when the website is a shopping website and the two objects are two different portable power banks, the user can provide a request such as, "Assistant, compare these two products." When the request is processed by generative output engine 324, the resulting model response may include information regarding both objects and/or information that exclusively describes differences between the two products associated with the two GUI elements. In some implementations, training data 338 can be generated based on such interactions to facilitate training of models utilized when responding to generative output requests involving interactions with a GUI element.

Figure 4:
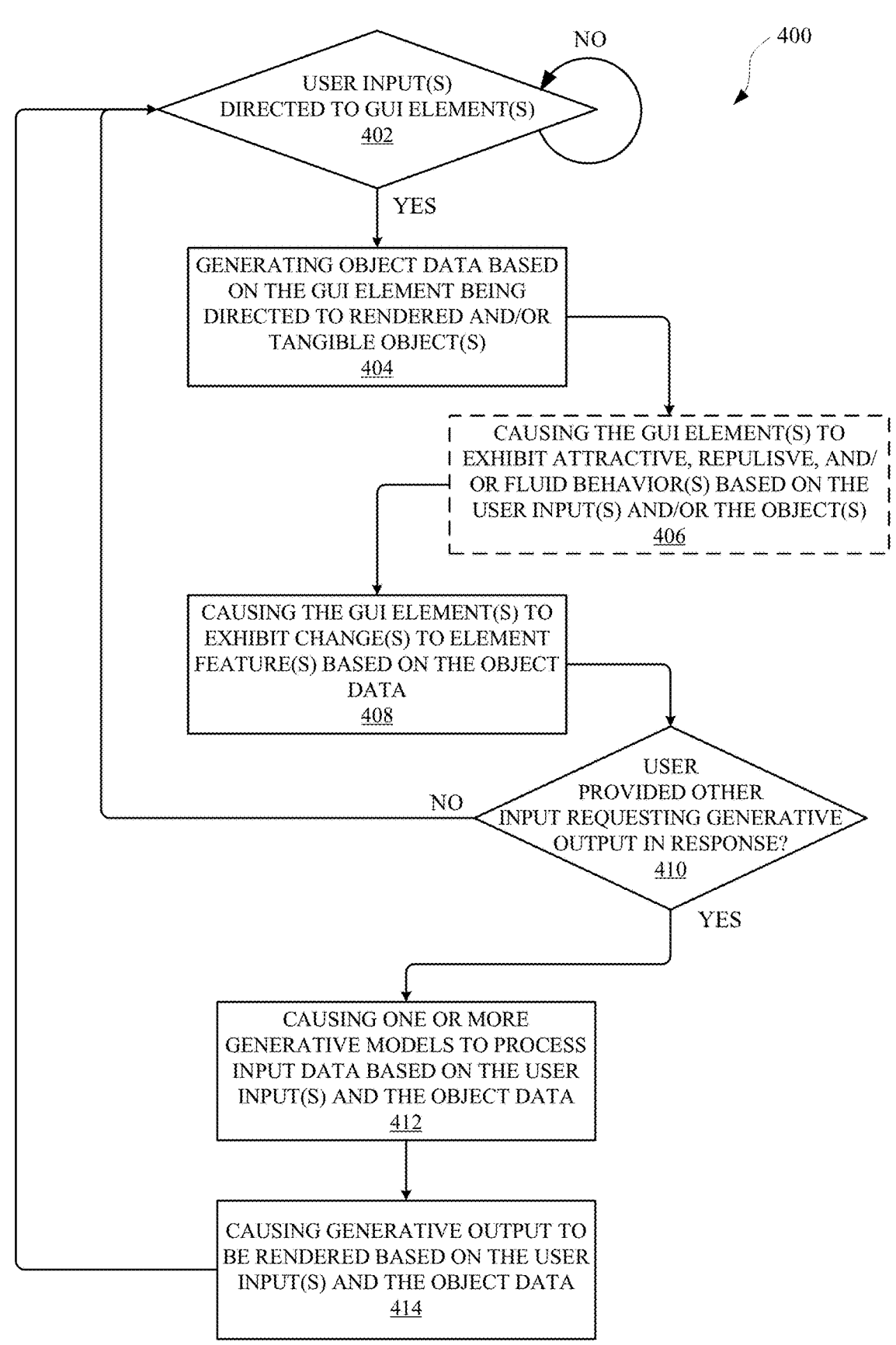
FIG. 4 illustrates a method for facilitating interactions with an automated assistant and/or other application that provide generative outputs based on natural language input and modification of one or more features of one or more GUI elements.

FIG. 4 illustrates a method 400 for facilitating interactions with an automated assistant and/or other application that provide generative outputs based on natural language input and modification of one or more features of one or more GUI elements. The GUI elements can correspond to one or more shapes and/or other graphics that can be rendered at a display interface to indicate whether or not a user is interested in an object that is visible to the user. This can preserve computational resources at any associated devices that facilitate such interactions, and also can render more accurate generative outputs as a result of consideration of user-identified image content, specified by a user via interactions with one or more GUI elements.

The method 400 can be performed by one or more applications, devices, and/or any other apparatus or module capable of facilitating interactions with an automated assistant. The method 400 can include an operation 402 of determining whether a user has provided one or more inputs to interact with one or more GUI elements. The GUI elements can correspond to at least a GUI element that is already rendered at the display interface, or is presented at the display interface in response to the user input. For example, the user can be wearing an augmented reality device that provides an ability for the user to see tangible objects in reality, as well as view virtual graphics that are augmented over the tangible objects using the display interface of the device. Alternatively, or additionally, the device can be a computing device with a touch display panel that may or may not be transparent, but can otherwise receive touch inputs at the display interface and/or at a peripheral device. When the device is a computing device such as an augmented reality wearable headset, the user can provide a gesture to cause the GUI element to be rendered at the display interface and/or pause the GUI element to relocate to be more proximate to an object of interest. For example, the gesture can include eye movement, movement of a user extremity, head movement, a facial expression, and/or any other type of gesture that can be performed by a user. In some implementations, the response of a GUI element to a gesture can be predetermined or learned over time using feedback from the user. In this way, the gesture that is directed to the GUI element can be responded to differently for different users. For example, a rapid hand movement towards a GUI element that directs the GUI element toward an object in a field of view of the user can indicate a greater degree of interest compared to a slower hand movement towards the GUI element that directs the GUI element towards another object.

When a user is determined to have provide a user input directed to a GUI element, the method 400 can proceed from the operation 402 to an operation 404. Otherwise, the application and/or computing device can continue to determine whether a user is directing an input to one or more GUI elements. The method 400 can include an operation of generating object data based on the GUI element being direct to a rendered and/or tangible object in response to the user input(s). For example, the object data can characterize one or more images corresponding to one or more objects that one or more GUI elements have been directed to. In some implementations, the one or more images can be captured by one or more cameras, and/or can be generated using existing data that corresponds to any rendered content that the user is viewing. For example, existing image data can be reduced or otherwise re-generated to emphasize any particular object(s) in an image(s) that the user may have directed one or more GUI elements towards or away from. In some instances, when the GUI element is being rendered at an augmented reality headset, an image can be captured (with prior person from any persons affected by the image) for determining the object that the GUI element has been relocated to appear more proximate to. The image can then be filtered, cropped, or otherwise adjusted so that any subsequent processing can emphasize the object of interest the user identified via their user input.

The method 400 can proceed from the operation 404 to an optional operation 406 of causing the GUI element to exhibit attractive, repulsive, and/or fluid behavior based on the user input and/or the object data. For example, the object data can characterize one or more features of the object, and input data can characterize the input provided by the user. The input data can indicate whether the user is expressing interest in an object, at least by indicating whether the user input directed a GUI element towards or away from the object. Alternatively, or additionally, the input data can indicate a degree of interest the user expressed in the object, for example, by characterizing a velocity, acceleration, and/ or any other feature of the input provided by the user.

In some implementations, an input can be determined to be expressing an interest in a particular object, and in response, the one or more feature of an object can be utilized to cause a GUI element to exhibit particular fluid behavior. Such behavior can include hydrophilic behavior that causes the GUI element to appear attracted to the object in a fluid-like manner, e.g., so that the GUI element automatically wraps around or surrounds the object when brought into sufficiently close proximity. Alternatively, or addition- ally, when the user is expressing a lack of interest for an object to be considered with a request for generative content, the user can maneuver a GUI element away from an object. In response, the GUI element can exhibit hydrophobic behavior relative to the object, thereby giving feedback to the user that their respective input is being considered a lack of interest in the object. Alternatively, or additionally, when the user is expressing interest in an object via the user input, the GUI element can be caused to exhibit hydrophobic behavior, thereby causing the GUI element to resemble a perimeter of the object. When the user completes their input to adjust the GUI element, the GUI element can remain in the position at the perimeter of the object, and may not withdraw away from the object perimeter despite initially exhibiting the hydrophobic behavior.

The method 400 can proceed from the operation 404 and/or the operation 406 to an operation 408 of causing the GUI element to exhibit a change to an element feature based on the object data. In some implementations, the element feature can be any property of a GUI element. In some implementations, the element feature can include any prop- erty of a GUI element that a user can perceive before, during, or after interacting with the GUI element via the user input. In some implementations, the GUI element may be rendered with a gradient of colors that reflect a brand of the underlying generative model and/or of an entity associated with the GUI element or larger computing environment (e.g., operating system). In some implementations in which the GUI element is rendered to resemble a bubble, this gradient of colors may be rendered similarly to the spectral colors that might appear on a real-life bubble (e.g., a soap bubble).

For example, a transparency, color, size, texture, pattern, volume, shape, boundary, area, and/or any other feature of the GUI element can change in response to the user input. For example, in some implementations, the GUI element may exhibit change in transparency and/or in color that is proportional to one or more features of the user input. For example, the level of transparency may increase or decrease, the intensity of the aforementioned color gradient may be increased or decreased, and so forth. The features of the user input can additionally or alternatively include, for example, a determined distance that a user extremity, and/or the GUI element, moves when providing at least a portion of the user input, and/or a determined velocity and/or acceleration of the user extremity, and/or the GUI element, when providing at least the portion of the user input. In this way, the user can receive feedback regarding their input to a GUI element, thereby allowing the user to confirm whether the GUI element was adjusted in a way that accurately indicates their interest in a particular object, or lack of interest in a particular object.

The method 400 can proceed from the operation 408 to an operation 410 that can include determining whether the user provided another input requesting a generative output. When the user is determined to have provided another input requesting the generative output, the method 400 can pro- ceed from the operation 410 to an operation 412. Otherwise, the method 400 can proceed from the operation 410 to an operation 402 for determining whether the user is continuing to interact with one or more GUI elements and/or perform one or more other operations. In some implementations, determining whether the user provided another input can include determining whether the user provided a natural language input directed to an automated assistant, and/or another application, that can provide generative output. In some implementations, the operation 410 can be performed using additional contextual data that is processed to deter- mine a likelihood that a spoken utterance of the user is directed to a computing device that a user is interacting with. Alternatively, or additionally, the operation 410 can be performed with, or without, determining whether the user provided an invocation phrase (e.g., "Assistant . . . ") with this other input. In some implementations, this other input can be provided before, during, and/or after the user inter- acts with the computing device and/or application to adjust an element feature(s) of a GUI element(s).

In some implementations, the operation 412 can include causing one or more generative models to be employed for processing input data based on the user input and the object data. In some implementations, one or more local devices and/or one or more remote devices can process element data, object data, input data, and/or any other input using one or more machine learning models to generate generative output data. For example, a language model, image model, and/or any other can be utilized to process input data corresponding to one or more GUI elements, object data corresponding to one or more objects associated with the one or more GUI elements, and/or additional input such as a natural language input (e.g., a typed input, spoken utterance, etc.). In some implementations, image data can be processed using one or more heuristic processes and/or one or more machine learn- ing models to reduce the amount of image data to be processed in furtherance of providing the generative output. Any reduced image data can then be processed with the natural language input to provide a generative output, with- out necessarily requiring extensive details, which might otherwise need to be provided for the same generative output to be rendered without also processing image data.

The method 400 can proceed from the operation 412 to an operation 414, which can include causing the generative output to be rendered based on the user input and/or the object data. The generative output can be, for example, a response to the spoken utterance that is also based on any information that can be associated with one or more objects that a GUI element has been maneuvered towards. For example, a GUI element rendered at a display interface of a virtual or augmented reality device can be relocated by a user to be near a pine tree that is in a field of view of the user. Upon causing the GUI element to relocate in response to a hand gesture, the user can provide a spoken utterance such as, "How tall will this grow?" In response, one or more devices can process (1) object data based on an image captured in response to the user relocating the GUI element, and (2) audio data characterizing the spoken utterance. Generative output data can then be generated, and a generative output can be rendered at the display interface, an audio interface, and/or one or more other interfaces. For example, the generative output can be audio and/or text such as, "Pine trees can usually grow from 3-80 meters high." In this way, the user would not be required to submit multiple spoken utterances in series to receive this detailed output, thereby preserving computational resources at any affected devices. For example, the user would not need to submit a request to identify the pine tree and then a request to figure how tall pine trees grow. Rather, the user can provide the aforementioned spoken utterance upon having directed a GUI element to be at or near a tangible or rendered object.

Figure 5:
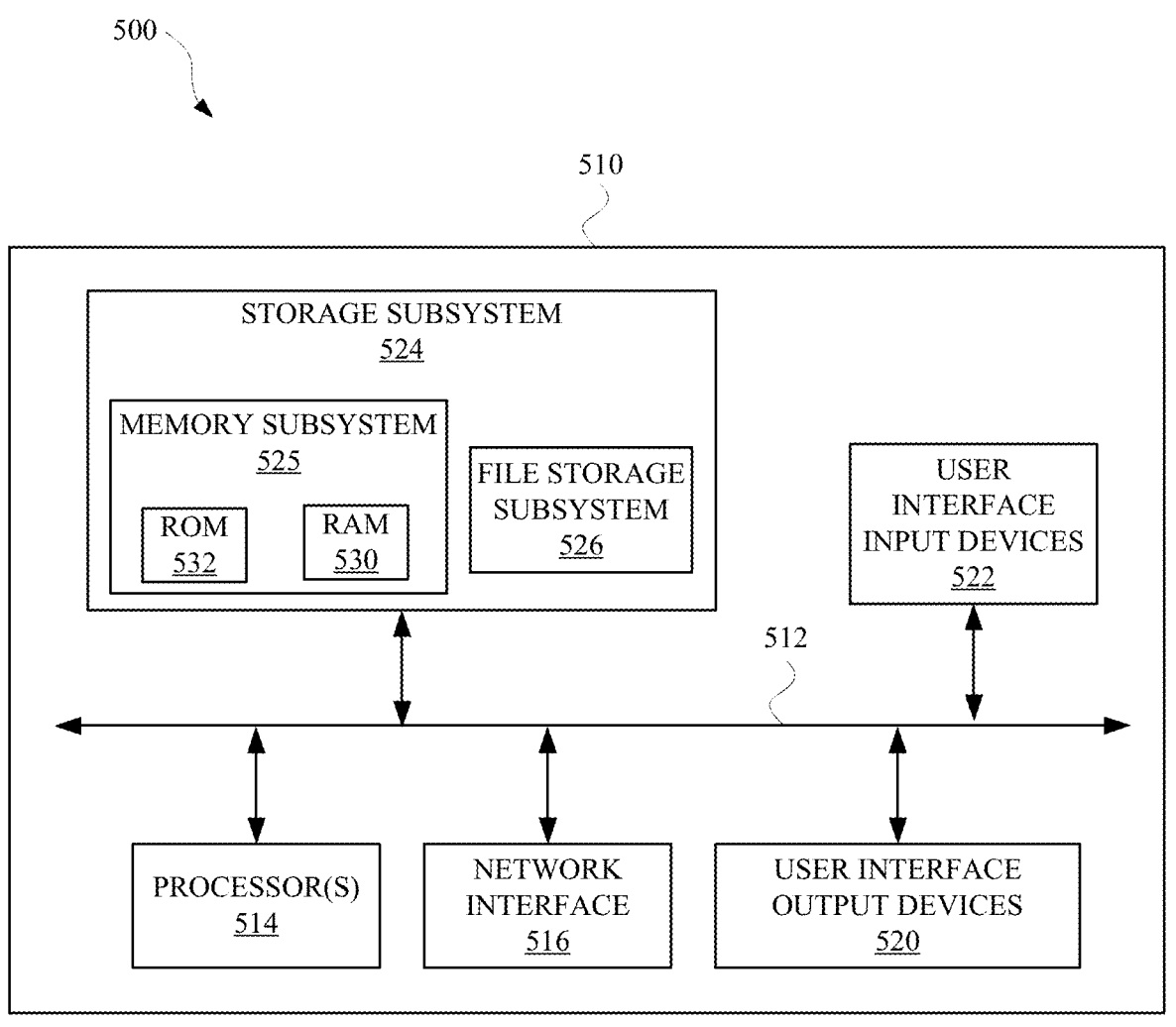
FIG. 5 is a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of system 300, computing device 104, computing device 204, automated assistant, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:

receiving a user input directed to causing a graphical user interface (GUI) element to relocate the GUI element relative to an object that is visible via a display interface of a computing device, wherein the GUI element can be relocated at the display interface to be associated with a rendered or tangible object that is visible to a user who is viewing the display interface;

generating, in response to receiving the user input, object data for the object that is visible via the display interface, wherein the object data characterizes an object feature of the object;

causing the GUI element to exhibit a change to an element feature for the GUI element based on the object data, and in response to the user input directed to the GUI element, wherein the change to the element feature causes the GUI element to exhibit one or more features that are based on the object data;

receiving a natural language input directed to an automated assistant, and/or another application, that uses one or more generative models to provide generative output based on the natural language input;

causing, in response to receiving the natural language input, the one or more generative models to be employed for processing input data that is based on the natural language input and the object data; and causing the computing device, or a separate computing device, to render the generative output.

2. The method of claim 1, wherein causing the GUI element to exhibit the change to the element feature includes:

causing the GUI element to resemble a portion of a boundary of the object, wherein the object data characterizes the portion of the boundary of the object.

3. The method of claim 1, wherein the object includes natural language content, and other objects visible via the display interface include other natural language content, and wherein the generative output is based on the GUI element being more proximate to the object than the other objects.

4. The method of claim 1, wherein the object is one object of a plurality of objects that are visible via the display interface, and the method further comprises:

causing the GUI element to appear to be automatically repelled from one or more other locations of one or more other objects of the plurality of objects.

5. The method of claim 1, further comprising:

determining a context of the user and content associated with the object; and causing, based on the context of the user and content associated with the object, the GUI element to appear to be automatically attracted to, or repelled from, an object location of the object.

6. The method of claim 1, further comprising:

causing at least a portion of the GUI element to extend or spread towards an object location of the object based on a pre-determined user preference, a context of the user, and/or a context of the object, wherein the object feature characterized by the object data is the object location.

7. The method of claim 1, wherein the user input causes the GUI element to relocate to be less proximate to another location of a separate object based on a pre-determined user preference, a context of the user, and/or a context of the object.

8. The method of claim 1, wherein the user input directed to causing the GUI element to relocate the GUI element relative to the object is a multimodal input that includes at least an audible component and/or a textual component.

9. The method of claim 1, wherein receiving the natural language input directed to the automated assistant, and/or the other application includes:

receiving an additional input directed to natural language content of the object, wherein the natural language input includes the natural language content of the object.

10. The method of claim 9, wherein the additional input is a user gesture directed to the computing device, or the separate computing device, to cause a text search to be performed using the natural language content of the object.

11. The method of claim 1, wherein causing the GUI element to exhibit the change to the element feature for the GUI element based on the object data includes:

causing the GUI element to exhibit a change in transparency and/or in color that is proportional to one or more features of the user input.

12. The method of claim 11, wherein the one or more features of the user input includes:

a determined distance that a user extremity, and/or the GUI element, moves when providing at least a portion of the user input, and/or a determined velocity and/or acceleration of the user extremity, and/or the GUI element, when providing at least the portion of the user input.

13. The method of claim 1, wherein the GUI element is visible at a virtual reality GUI, and/or an augmented reality GUI, rendered at the display interface of the computing device.

14. The method of claim 1, wherein the natural language input corresponds to a request for the automated assistant application, or the other application, to provide the generative output for indicating a difference between the object and another object associated with a separate GUI element rendered at the display interface.

15. The method of claim 1, further comprising:

causing, in response to receiving the user input, the GUI element to exhibit a fluid characteristic relative to one or more object features of the object and/or other objects visible via the display interface of the computing device, wherein the fluid characteristic includes cohesion, hydrophilic movement, hydrophobic movement, and/or surface tension.

16. The method of claim 15, wherein the GUI element dynamically exhibits the hydrophobic movement and/or hydrophilic movement when the element feature of the GUI element is changing based on the object data and in response to the user input directed to the GUI element.

17. A method implemented by one or more processors, the method comprising:

receiving one or more user inputs directed to causing graphical user interface (GUI) elements to relocate the GUI elements relative to objects that are visible via a display interface of a computing device, wherein the GUI elements can be relocated at the display interface to be associated with rendered and/or tangible objects that are visible to a user who is viewing the display interface;

generating, in response to receiving the user input, object data for the objects that are visible via the display interface, wherein the object data characterizes object features of the objects;

causing the GUI elements to exhibit changes to element features for the GUI elements based on the object data, and in response to the one or more user inputs directed to the GUI elements, wherein the changes to the element features cause the GUI elements to exhibit one or more features that are based on the object data;

receiving a natural language input directed to an automated assistant, and/or another application, that uses one or more generative models to provide generative output based on the natural language input;

causing, in response to receiving the natural language input, the one or more generative models to be employed for processing input data that is based on the natural language input and the object data; and causing the computing device, or a separate computing device, to render the generative output.

18. The method of claim 17, wherein the GUI elements are visible at a virtual reality GUI, and/or an augmented reality GUI, rendered at the display interface of the computing device.

19. A method implemented by one or more processors, the method comprising:

receiving a user input directed to causing a graphical user interface (GUI) element to relocate the GUI element relative to an object that is visible via a display interface of a computing device, wherein the GUI element can be relocated at the display interface to be associated with a rendered object that is visible to a user who is viewing the display interface;

generating, in response to receiving the user input, object data for the object that is visible via the display interface, wherein the object data characterizes an object feature of the object;

causing the GUI element to exhibit a change to an element feature for the GUI element, and/or the object, based on the object data, and in response to the user input directed to the GUI element, wherein the change to the element feature causes the GUI element and/or the object to exhibit one or more features that are based on the object data and the user input;

receiving a natural language input directed to an automated assistant, and/or another application, that uses one or more generative models to provide generative output based on the natural language input;

causing, in response to receiving the natural language input, the one or more generative models to be employed for processing input data that is based on the natural language input and the one or more features; and causing the computing device, or a separate computing device, to render the generative output.

20. The method of claim 19, wherein the GUI element dynamically exhibits hydrophobic movement and/or hydrophilic movement when the element feature of the GUI element is changing based on the object data and in response to the user input directed to the GUI element.

* * * * *